United States Patent [19]

Sherwood

[11] Patent Number: 4,510,105

[45] Date of Patent: Apr. 9, 1985

[54] METHOD OF MANUFACTURING A SURFACE-REINFORCED FOAM ARTICLE

[76] Inventor: Kent Sherwood, 2612 Highland Ave., Santa Monica, Calif. 90405

[21] Appl. No.: 409,563

[22] Filed: Aug. 19, 1982

[51] Int. Cl.³ .......................... B29D 27/04; B32B 5/20
[52] U.S. Cl. .................................. 264/46.6; 264/45.3; 264/46.5; 264/46.9; 264/162; 428/316.6
[58] Field of Search .................... 264/46.6, 45.3, 46.3, 264/46.5, 46.9, 162; 428/316.6

[56] References Cited

U.S. PATENT DOCUMENTS

| 2,728,702 | 12/1955 | Simon et al. | 264/46.6 X |
|---|---|---|---|
| 2,989,783 | 6/1961 | Slapnik | 264/46.6 X |
| 3,258,511 | 6/1966 | McGregor, Jr. | 264/46.6 X |
| 3,286,004 | 11/1966 | Hill et al. | 264/46.6 |
| 3,389,195 | 6/1968 | Gianakos et al. | 264/46.3 X |
| 3,431,331 | 3/1969 | Pincus et al. | 264/46.6 X |
| 4,120,632 | 10/1978 | Stoeberl | 264/46.6 X |
| 4,268,571 | 5/1981 | McCarthy | 264/46.6 X |
| 4,298,556 | 11/1981 | Rutsch et al. | 264/46.6 |

Primary Examiner—Philip Anderson

Attorney, Agent, or Firm—Freilich, Hornbaker, Rosen & Fernandez

[57] ABSTRACT

An improved method is described for molding an article having a core of foam and a surface reinforced by fiberglass cloth or the like, which enables more rapid setup for molding and which creates a stronger and more uniform article. The method includes laying several layers of dry tissure paper on the walls of the mold to form a first layer, laying dry fiberglass cloth over the first layer to create a second layer, and laying a sheet of dry tissue paper over the second layer to form a third layer. Foamable plastic is poured in the mold over the three layers and the mold is closed. As the plastic foams and expands, it first presses against the third layer to press it and the underlying first and second layers firmly against the mold walls to thereby position them evenly at the outer portion of the mold cavity. The foam material then penetrates the tissue paper of the third layer, the openings of the cloth of the second layer, and some of the layers of tissue paper of the first layer, before finally hardening. The outermost sheets of tissue paper facilitate release of the article from the mold, and also provide a conduit for the escape of gases during molding.

8 Claims, 6 Drawing Figures

METHOD OF MANUFACTURING A SURFACE-REINFORCED FOAM ARTICLE

BACKGROUND OF THE INVENTION

Surface-reinforced foam articles, which can be surfboards, airplane wings, etc., are often formed by laying fiberglass cloth against the walls of a mold cavity and impregnating the cloth with a resin by squeegying it on. The resin-impregnated cloth is allowed to dry and cure, and the dry cloth is trimmed so it does not overhang the flanges of the mold that extend beyond the cavity. A foamable material is poured on top of the impregnated cloth, and the mold is closed to allow the foamable material to expand and fill the region inside the fiberglass. This method has several disadvantages, including the relatively long time required to squeegy on the resin and let it dry and cure, the fact that gas produced by foaming often cannot escape so that it leaves voids that result in weak spots, and the considerable weight of the solid (nonfoam) laminating resin near the surface. Another technique is to lay dry fiberglass cloth on the mold walls before pouring in foaming plastic. This technique can leave weakened surface areas where fiberglass does not lie close against the surface, can leave elongated foam cells near the surface where gas bubbles expand along the fibers of the fiberglass, and can leave projecting fiberglass strands as a result of sanding during finishing. A technique for molding surface-reinforced foam articles which minimized the required time for construction while creating an article that was free of voids and other irregularities, would be of considerable value.

SUMMARY OF THE INVENTION

In accordance with one embodiment of the present invention, a method is provided for molding a surface-reinforced foam article, which enables the production of a uniformly strong product in a relatively short period of time. The method includes laying at least one layer of dry porous flexible material over the walls of a mold cavity, and foaming a plastic within the cavity inside the flexible porous layer. As the foamable material expands, it pushes on the flexible layer, which is porous but resistant to the flow-through of the foaming plastic, to push the layer firmly towards the cavity walls and to thereafter permeate the porous layer.

The amount of foamable material is selected so that it permeates partway through the porous layer, but not all of the way through, over substantially the entire area of the cavity walls. This allows the unpermeated dry material lying against the cavity walls, to permit release of the molded article from the cavity walls. The unpenetrated outer portion of the porous material also provides a conduit for carrying away gas created in the foaming process. The flange at the periphery of each mold half or part, is covered with the porous layer, so that gas flowing into the unpermeated portion of the layer can escape along the flanges.

The "at least one layer" laid on the mold walls can include an outermost first layer formed of multiple thicknesses of tissue paper, a second layer formed of an open cloth (woven or a net) of fiberglass or the like, and a third layer formed of one or a few thicknesses of tissue paper. The expanding foam initially presses on the third layer to press it and the other layers firmly towards the cavity wall, and then slowly permeates the tissue of the third layer and passes thorough holes in the cloth of the second layer to permeate tissues of the first layer. After the product is removed from the mold, the unpermeated tissues of the first layer can be peeled off and the article lightly sanded to prepare it for a final coating.

The novel features of the invention are set forth with particularity in the appended claims. The invention will be best understood from the following description when read in conjunction with the accompanying drawings.

DESCRIPTION OF THE PREFERRED EMBODIMENT

Figure 1:
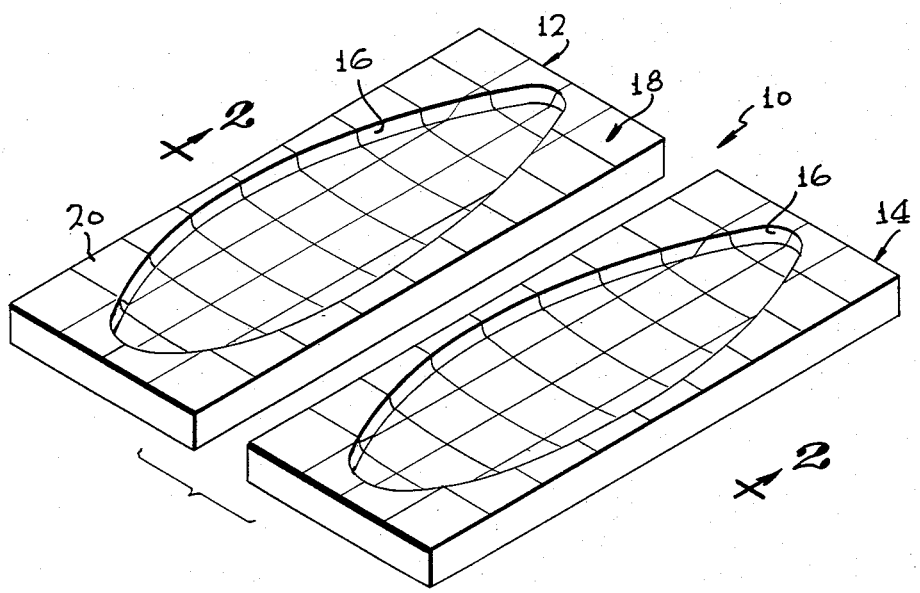
FIG. 1 is a perspective view of an open mold onto which layers have been applied in accordance with one step of the present invention.
Figure 2:
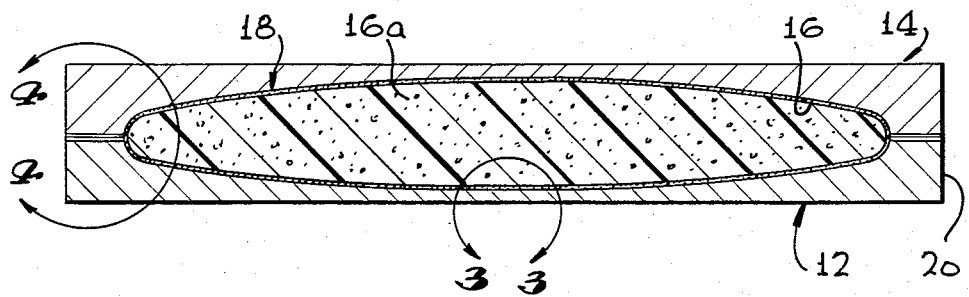
FIG. 2 is a view taken on the line 2—2 of FIG. 1, but with the mold closed and a molded product in the mold.

FIG. 1 illustrates a mold 10 with two mold parts, 12, 14 that form a mold cavity 16 defining the shape of a particular article such as a surfboard. To form the article, a group of layers 18 are laid on each mold part, against the walls of the cavity 16, and also on at least a portion of the flanges 20 that surround the cavity. The mixed components of a foamable material are then poured into the cavity portion of one mold part such as 12, and the mold is then closed. The foaming material expands to substantially fill the cavity 16, as shown in FIG. 2, to fill the volume 16a lying within the porous layers 18 as well as to fill most of the thickness of the layers 18. After the foam has hardened, the mold is opened, the molded article is removed, and then finishing operations are performed on the article.

Figure 3:
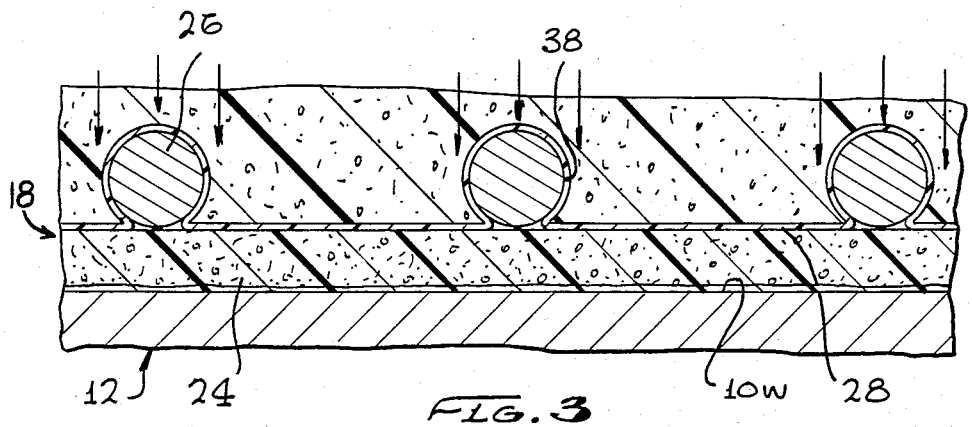
FIG. 3 is a view taken on the line 3—3 of FIG. 2.
Figure 4:
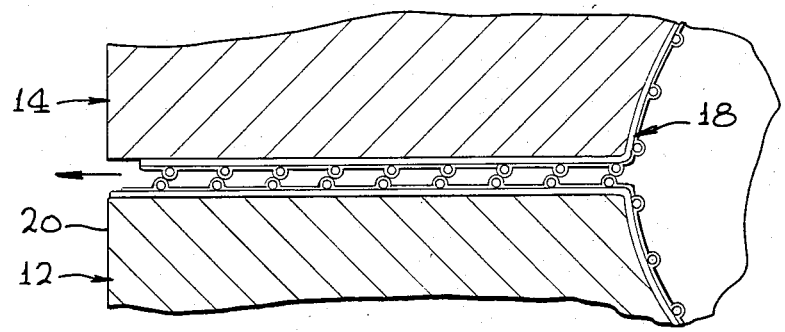
FIG. 4 is a view taken on the line 4—4 of FIG. 2.

As shown in FIG. 3, the group of layers 18 includes a first or outermost layer 24 that may consist of many sheets of tissue paper, a second or middle layer 26 which may consist of fiberglass cloth, and a third or innermost layer 28 which may consist of one or two sheets of tissue paper. The first layer 24 can be established by laying sheets of dry tissue paper—that is, tissue paper that has not been impregnated with a liquid resin—on the walls 10w of the mold wall, including some of the area of the flanges 20. The considerable thickness of the layer 24 can be achieved by laying perhaps ten sheets of tissue paper on one another. The cloth of layer 26, which is also dry, is laid on top of the layer 24, and finally, dry tissue sheets of layer 28 are laid on top of the cloth 26.

When foamable material expands within the mold cavity, it expands first against the third layer 28 and pushes it towards the mold walls 10w. The third layer, in turn, presses the other two layers 26, 24 so that the three layers become pressed firmly towards the mold wall. The expanding foam slowly permeates through the tissue paper sheets of the third layer 28 and then through most of the sheets of the first layer 24. The amount of foamable material has been selected which avoids permeation completely through all of the sheets of the first layer 24. Thus, the expanding foam serves to press the initially dry layers firmly towards the mold wall, and then permeates a considerable portion of the layers. The first and third layers of tissue paper are porous in that foaming plastic can penetrate them, but they are flow-through resistant in that it requires substantial time for such flow and there can be a large pressure build-up on the foam side which causes the sheets to be pressed hard towards the mold walls. Such flow-through resistance is a result of the fact that the first and third layers consist of substantially only fine fibers, which are much smaller than the large fibers such as at 26 of the fiberglass cloth second layer.

Figure 5:
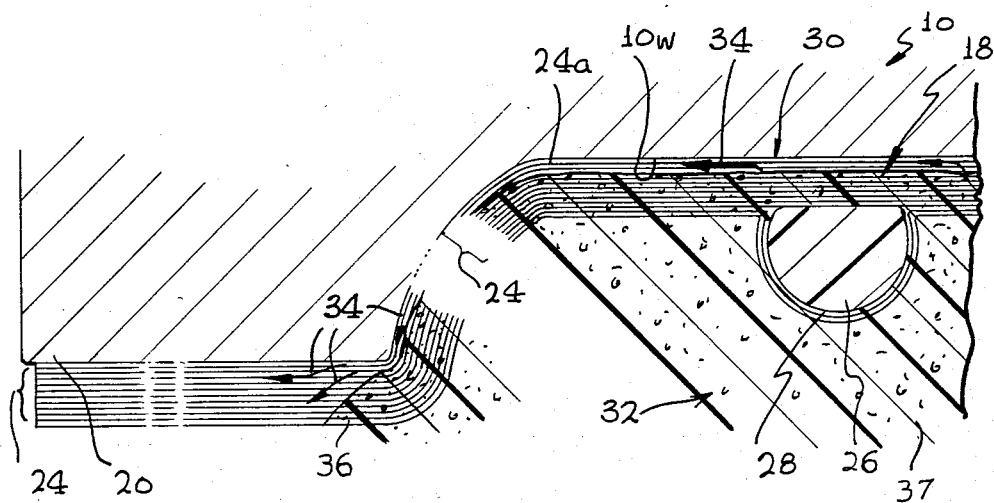
FIG. 5 is an enlarged view of part of the mold and article of FIG. 2.

FIG. 5 shows the molded article 30 after it has hardened within the mold. By that time, the foam material 32 has completely penetrated the third layer 28 and most of the sheets of the first layer 24, but has not penetrated the outermost sheets 24a of the first layer. This is useful because the unpenetrated dry outermost sheets 24a, then do not stick to the walls 10w of the mold, so that the article easily releases from the opened mold. In addition, the outermost portion 24a of layer 24 serves as a gas conduit through which gas generated by the expanding foamable material can escape. In some prior molding systems, the mold 10 was made of porous material, or some other steps were taken to permit the escape of gas. The use of the outermost sheets 24a and any other unpenetrated outer portion to carry away the gas, simplifies construction of the mold.

The flowing gas from the expanding foam indicated by the arrows 34, flows to the flanges 20 of the mold, where it escapes into the environment. In order to avoid blockage at the flanges, the outermost layer 24 of tissue sheets is laid on at least part of the flanges 20 during initial lay up of the dry tissue material. If desired, the second and third layers can also be laid on the flanges. Of course, this creates a bulge of foamable material at 36 where it penetrates into the flanges, but this region can be removed during final finishing. By permitting escape of gases at all outer regions of the molded article, we avoid back pressure of foam created by a buildup of pressure ahead of the expanding foam, which would create a weak spot in the article. Thus, the dry first layer and particularly the outermost sheets thereof, facilitate mold release and provide a conduit for the escape of gases created during foaming of the foamable material.

After the molded article has been removed from the mold, it is finished by peeling off the outermost sheet 24a of the first layer and any other dry layers beneath it, and then sanding the surface of the article so it is smooth and even. Then a coating is applied to the article. The article has considerable strength because of its reinforced surface area. The fibers of the cloth second layer 26 provide high tensile strength and they and the fibers of the tissue paper in the first and third layers 24, 28 provide high compressive strength in the surface of the article. Sanding and finishing is made easier by the fact that the extreme surface contains only the very small fibers of the tissue paper rather than the larger or bound fibers of the fiberglass. Separation or delamination of the surface portion from the rest of the foam or foam core 37, is minimized by the fact that the foam within the outer layers and particularly the tissue sheets of the layers 24, 28 are integral with and of the same material as the foam in the core.

The first and third layers 24, 28 should be constructed of material which is resistant to the rapid penetration of the foaming material, or in other words flow-through resistant to foaming plastic, so that the foaming material initially presses firmly against it and only slowly thereafter penetrates it; this assures that all layers will be pressed firmly towards the mold walls and will be thereafter penetrated. The second or middle layer 26 should be constructed of a strong material such as fiberglass through which foaming plastic easily flows or penetrates so that foam material can pass through the openings 38 (FIG. 3) between fibers or fiber strands of the second layer. A woven fabric, net, or loose matt configuration, each of which has openings easily penetrated by expanding foam, may each be referred to as a cloth and utilized for this purpose.

Applicant has molded articles in the illustrated manner, by using tissue paper sheets, each of about 1.5 mil thickness (1 mil equals 0.001 inch) and using ten of such sheets for the first layer 24 and one or two of such sheets for the third layer 28. Fiberglass cloth was used for the middle layer 26. The middle layer can be sheets of fiberglass, Kevlar, or other material, and such sheets can be laid in multiple layers. The middle layer also can be a unidirectional material laid in accordance with stresses that will be applied to the finished article. The foaming material was a polyurethane foam. After the polyurethane foam components are mixed, it required about 5 minutes for them to start reacting, while the mixed components are spread throughout the cavity and the mold is closed. It required about 12 minutes to complete the expansion of the foam. While the foam had a density of about 1½ pounds per cubic foot, the outer portion of the molded article had a density of about 20 pounds per cubic foot. The outer portion, and particularly the foam-inpregnated compressed tissue paper, is largely wood fibers glued together by the foam.

Figure 6:
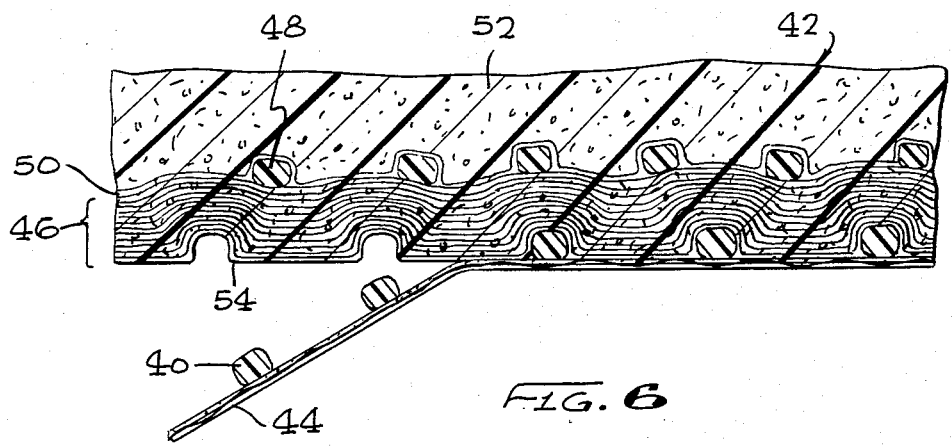
FIG. 6 is a partial sectional view of another molding technique, shown during stripping away of the strippable layer.

FIG. 6 illustrates another molding arrangement, wherein a layer 40 of open strippable material such as nylon mesh is utilized in the molding of an article 42, but the strippable layer is completely removed from the article after the molding operation. To mold the article, an underlayer 44 of dry porous material which resists penetration by foaming material, such as several layers of tissue paper or pellon (a polyester matt used as the insulation layer in quilts) is laid in a dry state on the mold wall. The dry strippable layer 40 is then laid over the underlayer 44. Then, a first layer 46 of dry porous material, a middle layer 48 which has openings so it is easily permeated and which is of fiberglass material or the like, and a top layer 50, respectively similar to the layers 24, 26, and 28 of FIG. 3, are laid down. Foaming material is placed in the mold cavity and the mold is closed. The amount of foam material is chosen so that it penetrates all of the layers, except part of the underlayer 44.

The strippable layer 40 is of a material that will not adhere to the foamable material 52. A variety of materials will low surface energy, such as nylon (Teflon has about the lowest surface energy of all known materials) can be used to avoid bonding of the foamable material to the strippable material 40. Such bond-resistant material is different from fiberglass or Kevlar that may be used for the middle layer 48, since such bond-resistant material will not bond to foam materials such as polyurethane which is commonly used as the core of foam articles. It is found that when the strippable layer is stripped off, there is a neat separation of the fibers of the strippable material 40 from the first layer 46, and of the underlayer 44 from the first layer 46. The final article has a surface 54 which is uniformly textured, and which does not require a large amount of peeling away and sanding to remove layers of tissue paper that are unpenetrated by foam. It is found that finishing coatings easily bond to this textured surface, and that the article can be relatively easily finished.

Thus, the invention provides a method for molding an article which enables the relatively rapid construction of a reinforced foam article, and which creates an article of high strength and low weight. This can be accomplished by providing a dry layer or layers of porous but not easily penetrated material at the surface of a mold cavity and along at least some of the flange area thereof, and expanding foam within the mold cavity. The expanding foam presses the porous layer firmly against the mold walls to avoid gaps between the sheets or other portions of the layer and to maintain the layer closely against the surface of the final molded article. The expanding foam also penetrates the porous layers to create an article with a foam core and with foam within the outer layers that is integral with and of the same material as the foam core without any adhesive bonding between them.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for constructing a surface-reinforced foam article comprising:
   laying a substantially dry porous but flow-through resistant first layer of flexible material consisting of substantially only fine fibers on the walls of a mold cavity, said mold cavity walls being devoid of any geletaneous coating that could penetrate through said first layer;
   laying a second layer of flexible easily permeated cloth material with openings, over the first layer, said second layer including fibers larger than those of said first layer;
   laying a substantially dry porous third layer of flow-through resistant flexible material over the second layer; and
   filling said mold cavity with foamable material which will form an expanding foaming liquid that solififies into a solid foam, and closing said mold;
   the amount of foamable material in said cavity being chosen, that the foaming foamable material permeates completely through said third layer and the openings of said second layer and permeates at substantially all areas of the mold, into said first layer before solidifying.

2. The method described in claim 1 wherein:
   said first layer is thick enough that it is partially penetrated everywhere along the walls of said cavity by said foamable material, but is penetrated substantially everywhere by less than the full thickness of the first layer, whereby the unpenetrated portion of the first layer facilitates release of the article from the mold.

3. The method described in claim 1 wherein:
   said first layer permits gas flow therethrough perpendicular to its thickness; and
   the mold has flanges surrounding said cavity and said step of laying said first layer includes laying said first layer on said flanges, whereby to carry gas out of the mold.

4. A method for constructing a surface-reinforced foam article comprising:
   laying a substantially dry underlayer of material which is porous but flow-through resistant to foaming plastic on the walls of a mold cavity;
   laying a dry strippable layer of flexible easily permeated material with openings, on said underlayer;
   laying at least one reinforcing layer comprising substantially dry, flexible material on the strippable layer, wherein said reinforcing layer material is porous but flow-through resistant to foaming plastic; and
   filling mold cavity with foamable material which will form an expanding foaming liquid that solidifies into a solid foam, and closing said mold;
   said at least one reinforcing layer being sufficiently impervious to said foamable material as its foams, that the pressure buildup behind said reinforcing layer presses it and said strippable layer and underlayer firmly toward the mold walls, but said reinforcing layer being sufficiently porous that the foaming foamable material permeates completely through said reinforcing layer and the openings at said strippable layer, and permeates into said underlayer before solidifying;
   said reinforcing layer being of material that adheres to said liquid foaming material, but said strippable layer being of a material that does not adhere to said liquid foaming material;
   opening said mold and removing the molded article therein; and
   stripping away said strippable layer and the underlayer from the molded article.

5. A method for constructing a surface-reinforced foam article comprising:
   laying a substantially dry underlayer of porous but penetration resistant material on the walls of a mold cavity;
   laying a dry strippable layer of flexible easily permeated cloth-like material with openings on said underlayer;
   laying a substantially dry porous first layer of flexible material on said strippable layer;
   laying a second layer of flexible easily permeated cloth material with openings over the first layer;
   laying a substantially dry porous third layer of flexible material over the second layer; and
   filling said mold cavity with foamable material which will form an expanding foaming liquid that solidifies into a solid foam, and closing said mold;
   said third layer being sufficiently impervious to said foamable material as it foams, that the pressure buildup behind said third layer presses it and the other layers firmly toward the mold walls, but said third layer being sufficiently porous that the foaming foamable material permeates completely through said third layer, the openings of said second layer, said first layer, and the openings at said strippable layer, and permeates into said underlayer before solidifying;
   said second layer being of a material that adheres to said liquid foaming material, but said strippable layer being of a material that does not adhere to said liquid foaming material;
   opening said mold and removing the molded article therein; and
   stripping away said strippable layer and the underlayer from the molded article.

6. A method for constructing a surface-reinforced foam article, comprising:

establishing at least one layer comprising substantially dry flexible material on the cavity walls of a mold that has a cavity, wherein said layer of material is porous but flow-through resistant to foaming plastic and consists of substantially only fine fibers that permit the flow of gas sidewardly along the layer; and foaming a foamable plastic material within the cavity at a location at the inner side of said layer, expanding said foamable material to push on said layer to push it firmly toward the cavity walls, and permeating part of the thickness but not all of the thickness of said layer with said foaming material over substantially the entire area of said cavity walls;

said mold includes two mold parts that each comprise part of the mold cavity and that are each resistant to the penetration of gas, each mold part having a flange portion that can substantially facewise engage a flange portion of the other part in the absence of said layers, and said step of establishing includes laying at least one layer of said porous material on the flange portion of at least one of said mold parts, whereby to facilitate escape of gas.

7. A method for constructing a surface-reinforced foam article, comprising:

establishing a first flow-through resistant layer against the cavity walls of a mold that has a cavity, wherein said first layer consists substantially of fine fibers and is porous but flow-through resistant and said mold walls are free of a geletaneous coating that would penetrate through said first layer;

establishing a second layer of open cloth material containing fibers that are thicker than those of said first layer, so the second layer lies over said first layer, foaming plastic easily flowing through said second layer, and a third flow-through resistant layer lying over said second layer, said first and third layers being less permeable to said foamable material than said second layer;

foaming a foamable plastic material within the cavity at a location at the inner side of said layers, expanding said foamable material to push on said third layer, to thereby press said layers, including the cloth material, close to the cavity walls, slowly permeating said third layer, more rapidly permeating said second open cloth material of said second layer, and slowly permeating only part of the thickness of said first layer along substantially all areas of said first layer, with said foamable material.

8. The method described in claim 7 including:

allowing said foam to solidify to form an article, removing the article from said mold, and removing from the article the outermost portion of said first layer which is unimpregnated with said foamable material.

* * * * *